United States Patent [19]

Hamada et al.

[11] Patent Number: 5,308,090
[45] Date of Patent: May 3, 1994

[54] SPIRAL WOUND GASKET

[75] Inventors: Eiichi Hamada, Toyota; Koji Shimoji, Susono; Suekichi Hangeishi, Toyota; Mamoru Yashima, Nagoya; Takahisa Ueda, Sanda; Keiji Okada, Hyogo; Shoichi Nishiwaki, Sanda, all of Japan

[73] Assignee: Nippon Pillar Packing Co., Ltd., Osaka, Japan

[21] Appl. No.: 978,458

[22] Filed: Nov. 19, 1992

Related U.S. Application Data

[63] Continuation of Ser. No. 713,774, Jun. 12, 1991, abandoned.

[51] Int. Cl.$^5$ ............................................. F16J 15/02
[52] U.S. Cl. .................................... 277/204; 277/11; 277/233
[58] Field of Search ................ 277/204, 207 A, 9, 11, 277/198, 233, 234

[56] References Cited

U.S. PATENT DOCUMENTS

| | | | |
|---|---|---|---|
| 816,478 | 3/1906 | Kirschning | 277/204 |
| 1,089,134 | 3/1914 | Hettinger | 277/204 X |
| 1,595,855 | 8/1926 | Clark | 277/198 |
| 1,829,709 | 10/1931 | Bohmer, Jr. | 277/204 X |
| 1,942,703 | 1/1934 | Hubbard et al. | 277/204 |
| 2,027,299 | 1/1936 | Bohmer, Jr. et al. | 277/204 |
| 2,239,479 | 1/1944 | McCreary | 277/204 X |
| 2,257,334 | 9/1941 | David | 277/204 |
| 2,357,257 | 8/1944 | Goetz | 277/204 |
| 2,580,546 | 1/1952 | Hobson, Jr. | 277/204 X |
| 2,827,320 | 3/1958 | Kane | 277/198 |
| 2,828,987 | 4/1958 | Schmitz | 277/198 |
| 2,882,083 | 4/1959 | Palumbo et al. | 277/204 X |
| 3,132,870 | 5/1964 | Pschera | 277/204 |
| 4,068,853 | 1/1978 | Schnitzler | 277/204 X |
| 4,361,335 | 11/1982 | Vincignerra | 277/204 |
| 4,575,917 | 3/1986 | Kana et al. | 277/204 X |
| 4,607,851 | 8/1986 | Usher | 277/204 X |
| 4,673,187 | 6/1987 | Hanson et al. | 277/204 X |

FOREIGN PATENT DOCUMENTS

| | | | |
|---|---|---|---|
| 246073 | 2/1961 | Australia | 277/204 |
| 188166 | 2/1956 | Austria | 277/11 |
| 578689 | 6/1959 | Canada . | |
| 0011354 | 1/1977 | Japan | 277/204 |
| 1213243 | 11/1970 | United Kingdom | 277/204 |
| 1298987 | 12/1972 | United Kingdom | 277/204 |

*Primary Examiner*—William A. Cuchlinski, Jr.
*Assistant Examiner*—John L. Beres
*Attorney, Agent, or Firm*—Jones, Tullar & Cooper

[57] ABSTRACT

A spiral wound gasket having an annular body serving as a centering member which is integrally disposed at the inner periphery side of a gasket body formed by winding, in the form of a spiral. The gasket body comprises a metal hoop material and a filler material overlapping each other. When this gasket is disposed at fit-joint-type pipe connection portions of the exhaust pipe system in a motor vehicle, the annular body serves as a centering member to prevent the gasket body from protruding into the fit joint. This prevents the gasket body from deterioration and damage, thus assuring a high sealing property for a long period of time. Further, merely by inserting and fitting the gasket, the gasket may be automatically aligned and positioned with respect to the fit joint. Further, the inner peripheral surface of the gasket body and the annular body form an annular closed space, thus making the entire gasket into a lightweight design.

3 Claims, 5 Drawing Sheets

SPIRAL WOUND GASKET

This is a continuation of co-pending application Ser. No. 07/713,774 filed on Jun. 12, 1991 now abandoned.

BACKGROUND OF THE INVENTION

1. Field of the Invention

The present invention relates to a gasket having excellent sealing properties to be disposed at fit-joint-type pipe connection portions of, for example, the exhaust pipe system in a motor vehicle in which a high-temperature gas flows. More specifically, the present invention relates to a spiral wound gasket formed by winding, in the form of a spiral, a metal hoop material and a filler material overlapping each other.

2. Description of the Prior Art

As a gasket to be used for sealing the ends of exhaust pipes in, for example, an internal combustion engine, there is known a gasket as disclosed in Japanese Utility Model Publication 190665/1988.

Such a gasket is made in the following manner. As shown in FIGS. 8 and 9, a gasket 22 is formed by winding, in the form of a ring, a band-like steel sheet 20 and a gasket material 21 such as asbestos overlapping each other. In the gasket 22, the winding end 20A of the band-like steel sheet 20 at the outer periphery side of the gasket 22 is raised such that, when the gasket 22 is inserted into a large-diameter portion 24 of an exhaust hole 23, the winding end 20A resiliently comes in contact with the large-diameter portion 24.

In the gasket 22 having the arrangement mentioned above, when the gasket 22 is inserted into the large-diameter portion 24 of the exhaust hole 23, the winding end 20A at the outer periphery side is turned inwardly, causing the winding end 20A to resiliently come in contact with the large-diameter portion 24. Accordingly, the gasket 22 is so held as not to fall off of the exhaust hole 23 due to vibration or the like. It is therefore not necessary to support the gasket 22 by hand or with a jig until a flange portion 25A of an exhaust pipe 25 comes in contact with the gasket 22. This advantageously improves the workability of attaching of the gasket 22 and the exhaust pipe 25.

In the conventional gasket 22 mentioned above, however, there is a likelihood that a portion of the gasket 22 will protrude into the exhaust pipe 25 in a state where the gasket 22 is properly installed. If a portion of the gasket 22 protrudes into the exhaust pipe 25, the protruding portion deteriorates or is damaged, causing the sealing properties of the gasket to be decreased in a short period of time.

SUMMARY OF THE INVENTION

To overcome the defects mentioned above, the present invention is proposed which has as an object of providing a spiral wound gasket which is so arranged as to prevent a portion thereof from protruding into the exhaust pipe thereby avoiding the noted deterioration or damage, thereby assuring that a high sealing property is retained for a long period of time, be readily positioned for alignment improvement in the workability of attachment so that the gasket can and which may be economically made in a lightweight design.

It is another object of the present invention to provide a spiral wound gasket the productivity of which may be readily improved to further lower the production cost.

To achieve the objects mentioned above, the spiral wound gasket in accordance with the present invention which is to be used with pipe connection portions fitted and connected to each other through a fit joint, is formed by winding, in the form of a spiral, a metal hoop material and a filler material overlapping each other, and is characterized in that an annular body serving as a centering member is integrally disposed at the inner periphery side of the gasket body in which the metal hoop material and the filler material overlap each other.

When the spiral wound gasket having the arrangement mentioned above according to the present invention is used at a fit-joint-type pipe connection portion of, for example, the exhaust pipe system in a motor vehicle, the annular body comes in contact with the outer peripheral surface of the upstream-side exhaust pipe including a fit joint. Accordingly, the annular body serves as a centering member, thereby preventing the gasket body from protruding into the fit joint. This considerably prevents the gasket body, in particular the filler material, from deteriorating or becoming damaged due to the high-temperature gas. Accordingly, the gasket may assure, in its entirety, high sealing properties for a long period of time.

Further, when the inner diameter of the annular body is set to a predetermined size according to the diameter of the fit joint, the spiral wound gasket may be automatically aligned and positioned with respect to the fit joint merely by putting the annular body on the fit joint. This improves the workability of attachment of the gasket.

Further, the inner peripheral surface of the gasket body and the annular body form an annular closed space, thus permitting the entire gasket to be made in a lightweight design.

According to the present invention, the body of the spiral wound gasket may have a corrugated section and may be provided at the inner and outer periphery portions thereof with waste wound portions where only the metal hoop material is wound a plurality of times.

According to the gasket having the arrangement mentioned above, since the gasket body has a corrugated section, the gasket has sufficient stretchability in the axial direction so that both end surfaces of the gasket body in the axial direction resiliently come in contact with the surfaces of members to be sealed, thereby assuring high sealing properties. Further, since the gasket body is provided at the inner and outer peripheral portions thereof with waste wound portions where the metal hoop material is wound several times, the gasket body is increased in its shape retention strength. This further improves the workability of attachment of the gasket as aligned and positioned.

According to the present invention, the spiral wound gasket may be made such that the metal hoop material having a V- or U-shaped section forming the annular body, and the metal hoop material having a corrugated section forming the gasket body, are integrally molded in a continuous manner.

In this case, a single metal hoop material may be molded by rolls, while continuously fed, so as to have predetermined shaped sections as the metal hoop material forming the annular body and the metal hoop material forming the gasket body. It is therefore possible to manufacture, with good productivity, a spiral wound gasket excellent in workability of attachment. Accordingly, production cost increases may be prevented for the provision of the annular body.

Other objects and effects of the present invention will be apparent from the following description made with reference to the attached drawings showing embodiments thereof.

DETAILED DESCRIPTION OF THE PREFERRED EMBODIMENTS

The following description will discuss embodiments of the present invention with reference to the attached drawings.

Figure 1:
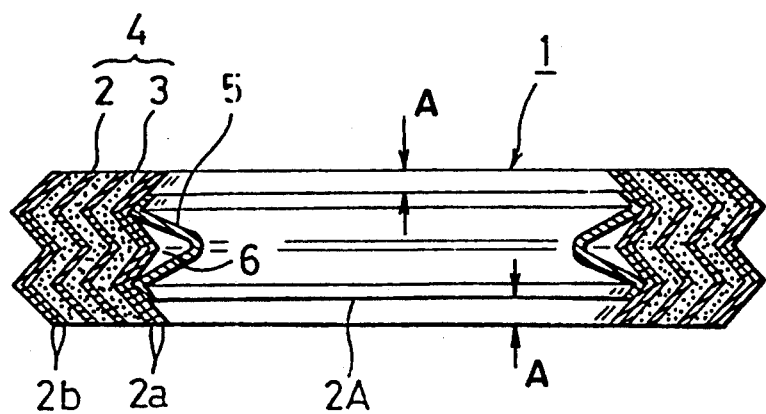
FIG. 1 is a vertical section view in front elevation of a spiral wound gasket in accordance with an embodiment of the present invention.

FIG. 1 is a vertical section view of an embodiment of the present invention. In FIG. 1, a spiral wound gasket 1 comprises a gasket body 4 formed by winding, in the form of a spiral, a metal hoop material 2 and a filler material 3 overlapping each other, and an annular body 5 serving as a centering member which is coaxially disposed at the inner periphery of the gasket body 4.

In the gasket body 4, the metal hoop material 2, such as stainless steel, is so molded as to have a corrugated section such as a W-shaped section. At the inner peripheral surface of the gasket body 4, only the metal hoop material 2 is wound two to three times to form a waste wound portion 2a. Then, the filler material 3 having characteristics serving as a soft sealing material, overlaps outside the outer surface of the metal hoop material 2 with respect to the waste wound portion 2a. The metal hoop material 2 and the filler material 3 overlapping each other are then wound in the form of a spiral. At the outer peripheral surface of the gasket body 4, only the metal hoop material 2 is wound two to three times to form a waste wound portion 2b. The winding starting end of the waste wound portion 2a at the inner periphery side and the winding terminal end of the waste wound portion 2b at the outer periphery side, are respectively secured to the adjacent waste wound portions 2a, 2b by, for example, spot welding.

Figure 2A:
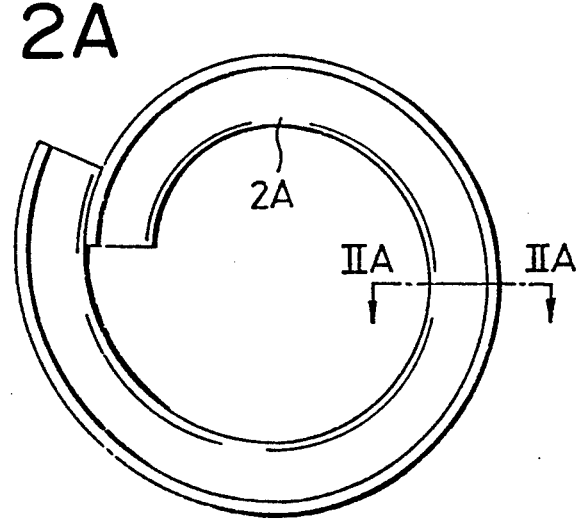
FIG. 2A is a plan view of an example of the material of an annular body.
Figure 2B:
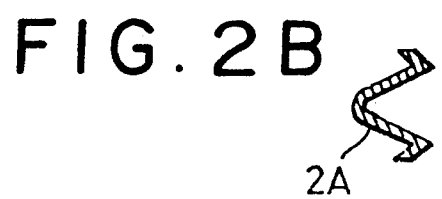
FIG. 2B is a section view taken along the line IIA—IIA in FIG. 2A.
Figure 3:
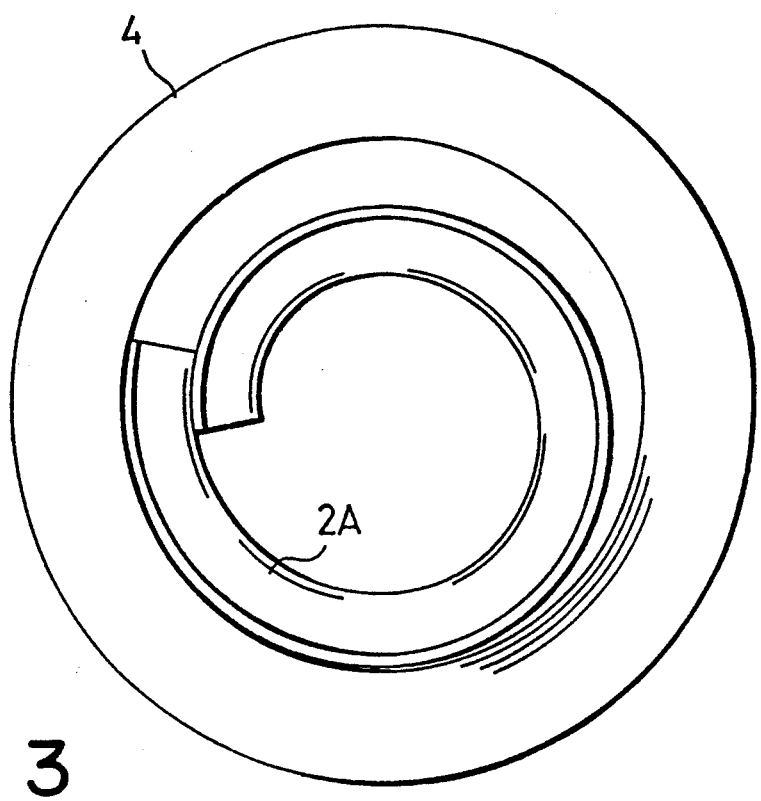
FIGS. 3 and 4 are plan views illustrating how to assemble the annular body with the gasket body.
Figure 4:
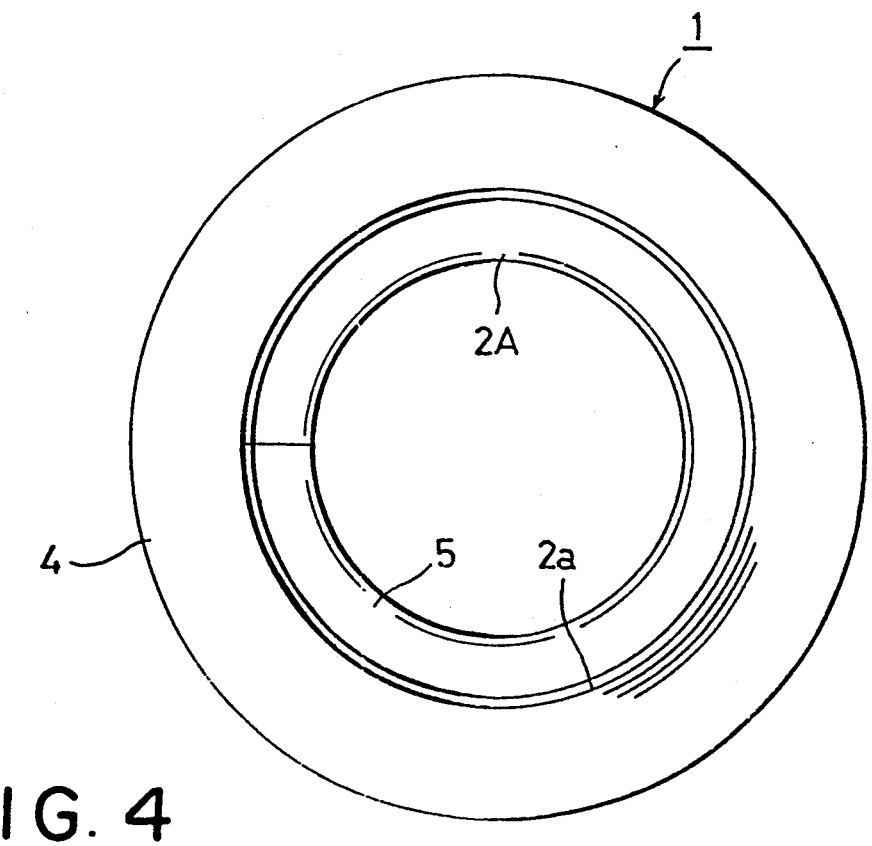

The annular body 5 is formed in the following manner. As shown in FIGS. 2A and 2B, a metal hoop material having a V-shape section 2A is wound with the open ends thereof diametrically outwardly directed, such that both cut ends thereof overlap each other. The metal hoop material 2A thus wound is then fitted in the gasket body 4 at the inner periphery thereof as shown in FIG. 3. With both cut ends abutting each other, the metal hoop material 2A then comes in contact with the inner peripheral surface of the waste wound portion 2a. Thus, the annular body 5 is integrally formed at the inner periphery of the gasket body 4. The metal hoop material having a V-shape section 2A and the inner peripheral surface of the waste wound portion 2a form an annular closed space 6 having a V-shape section (See FIG. 1).

The distance (A) from each of the generally flat outer surfaces of the gasket body 2, 3 to the annular metal body 5 is substantially equal.

Figure 5:
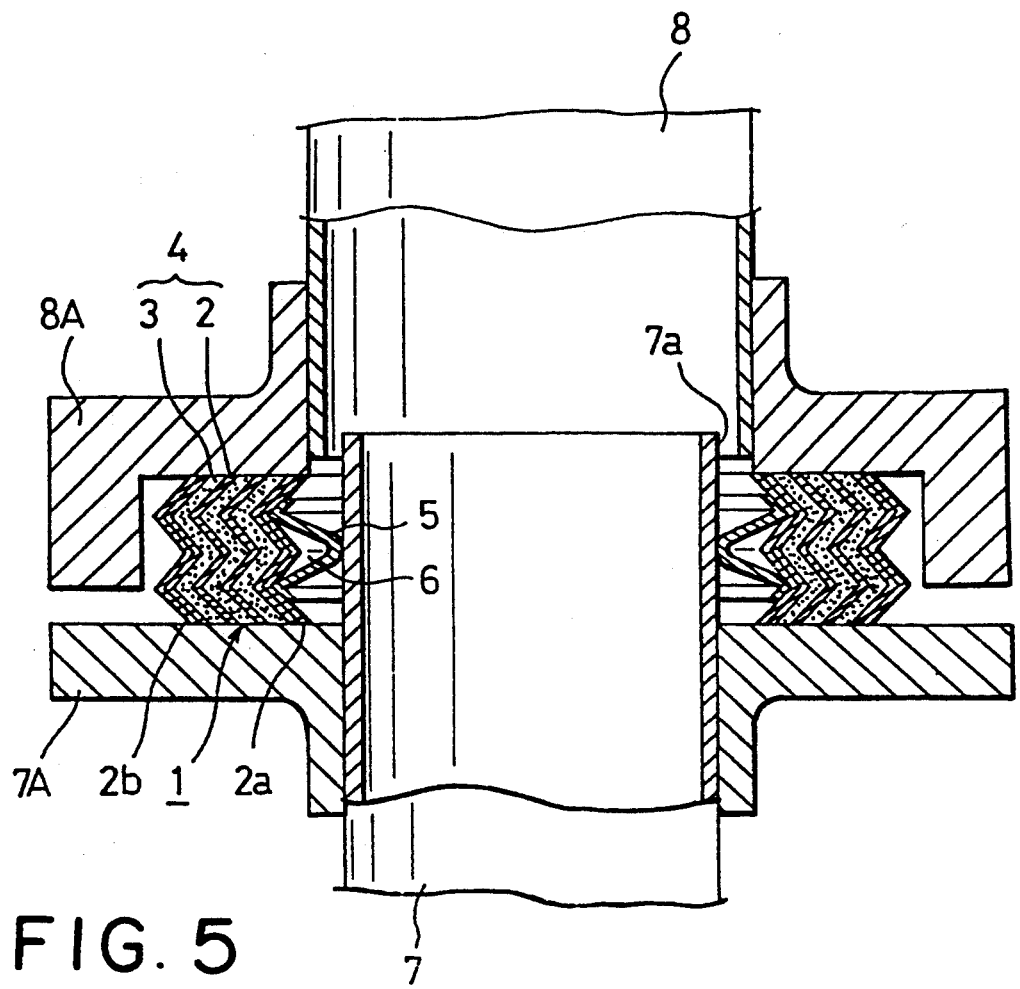
FIG. 5 is a vertical section view in front elevation of an example of the use of the gasket shown in FIG. 1.

When the spiral wound gasket 1 having the arrangement mentioned above is disposed, as shown in FIG. 5 for example, in the exhaust pipe system of a motor vehicle at its position defined by an upstream-side exhaust pipe 7, a flange 7A, a fit joint 7a forming a projecting portion at the terminal end of the upstream-side exhaust pipe 7 and a socket-type flange 8A of a downstream-side exhaust pipe 8, the spiral wound gasket 1 is mounted on the fit joint 7a with the annular body 5 coming in contact with the upstream-side exhaust pipe 7 having the fit joint 7a. Accordingly, the gasket 1 does not protrude into the socket-type flange 8A. This prevents the gasket body 4, in particular the filler material 3, from deterioration and damage. Thus, the gasket 1 assures high sealing properties for a long period of time.

When the annular body 5 has such an inner diameter that the annular body 5 is put on the fit joint 7a of the upstream-side exhaust pipe 7 with no gap produced therebetween, the spiral wound gasket 1 may be automatically aligned and positioned with respect to the fit joint 7a merely by putting the annular body 5 on the fit joint 7a. This improves the workability of attachment.

Further, since the inner peripheral surface of the gasket body 4 and the annular body 5 form the annular closed space 6 having a V-shaped section, the gasket 1 may be made in a lightweight design.

Figure 6:
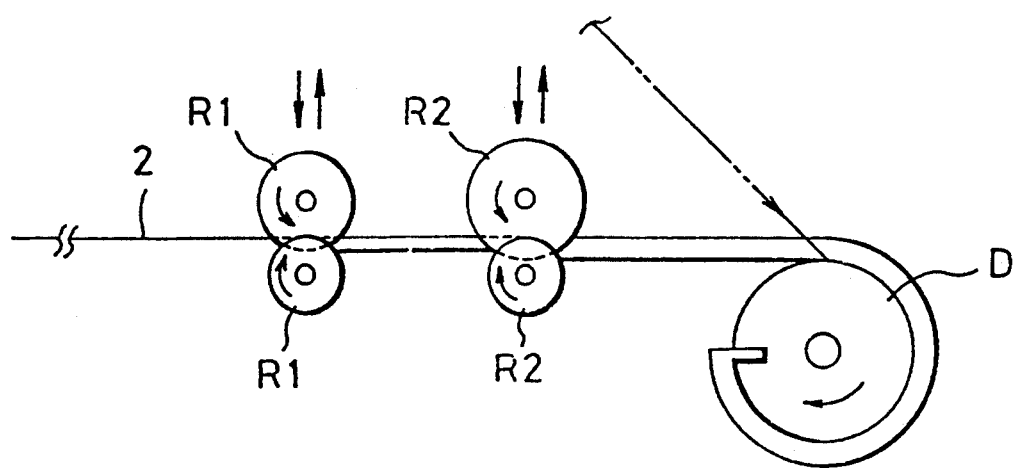
FIG. 6 is a schematic side view of an example of an apparatus for manufacturing the gasket of the present invention.

In the embodiment mentioned above, the spiral wound gasket 1 has been described as being made by a method comprising the steps of winding the metal hoop material having a V-shape section 2A with the open ends thereof diametrically outwardly directed such that both cut ends thereof overlap each other as shown in FIGS. 2A and 2B, and fitting the metal hoop material 2A thus wound in the gasket body 4 at the inner periphery side thereof with both cut ends abutting each other, as shown in FIG. 3, such that the metal hoop material 2A comes in contact with the inner peripheral surface of the waste wound portion 2a, thus forming the annular closed space 6 having a V-shaped section by the metal hoop material having a V-shaped section 2A and the inner peripheral surface of the waste wound portion 2a, so that the annular body 5 is disposed and serves as a centering member. However, the spiral wound gasket 1 in accordance with the present invention may be alternatively made in the following manner. That is, there are disposed, as shown in FIG. 6, first molding rolls R1 which are adapted to so mold the metal hoop material 2 as to have a W-shaped section and which are movable in both directions toward and away from each other, and second molding rolls R2 which are adapted to so mold the metal hoop material 2 as to have a V-shaped section and which are movable in both directions toward and away from each other, these molding rolls R1 and R2 being disposed in the metal hoop material conveying direction at a suitable spatial interval. With the first molding rolls R1 separated from each other and the second molding rolls R2 contacted with each other, the metal hoop material 2 is molded into the metal hoop material having a V-shape section 2A by the second molding rolls R2, and is then wound on a winding drum D one to two times. Then, with the second molding rolls R2 separated from each other and the first molding rolls R1 contacted with each other, the metal hoop material 2 is so molded as to have a W-shaped section and then wound two to three times to form the waste wound portion 2a at the inner periphery side. Accordingly, the metal hoop material having a V-shaped section 2A and the inner peripheral surface of the waste wound portion 2a form the annular closed space 6 having a V-shaped section, thus forming the annular body 5. Then, the filler material 3 is fed to overlap the metal hoop material 2 and is wound several times in the form of a spiral. Then, feeding the filler material 3 is stopped and only the metal hoop material 2 is wound two to three times to form the waste wound portion 2b at the outer periphery. After the metal hoop material 2 is cut, the winding terminal end of the waste wound portion 2b at the outer periphery is secured to the adjacent waste wound portion 2b by, for example, by spot welding. Thus, there is formed the spiral wound gasket 1 having the gasket body 4 and the annular body 5 in a continuous manner.

Figure 7A:
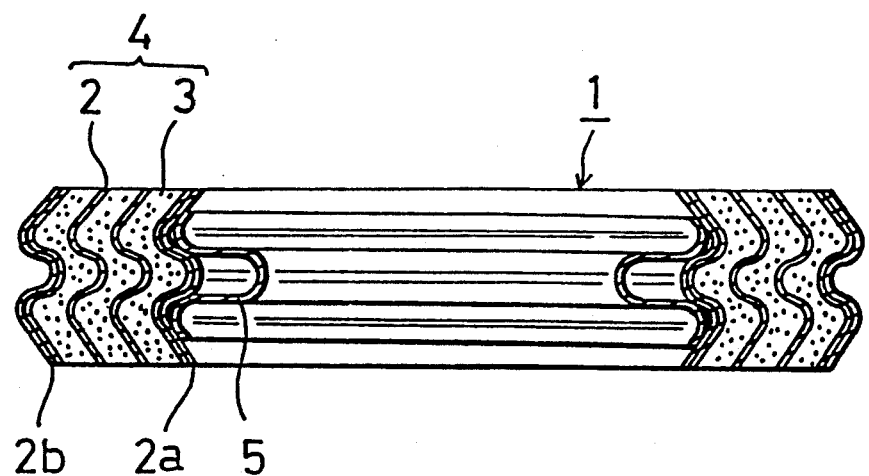
FIGS. 7A and 7B are vertical section views in front elevation of the gaskets in accordance with another embodiments of the present invention.

In the embodiment mentioned above, the description has been made of the gasket in which the metal hoop material 2 forming the gasket body 4 has a W-shaped section and the annular body 5 has a V-shaped section. However, the metal hoop material 2 forming the gasket body 4 may have a round, W-section and the annular body 5 may have a U-shaped section, as shown in FIG. 7A.

Figure 7B:
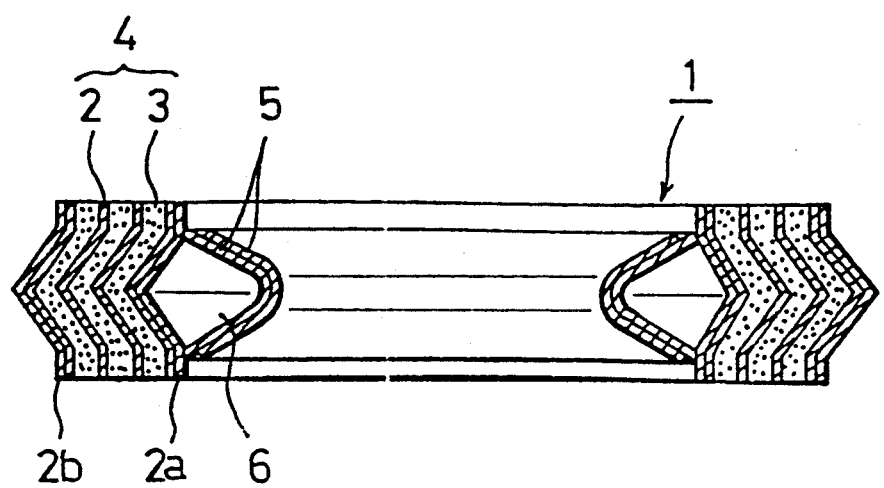
Figure 8:
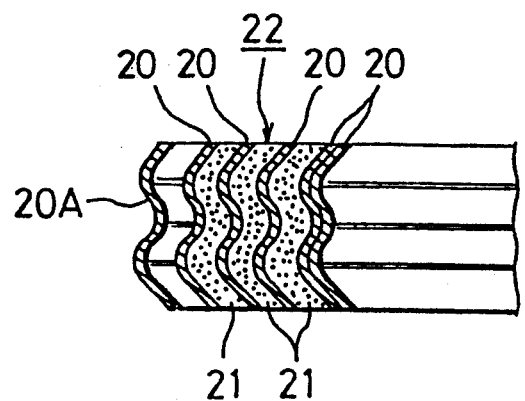
FIG. 8 is an enlarged vertical section view of a portion of a conventional spiral wound gasket.
Figure 9:
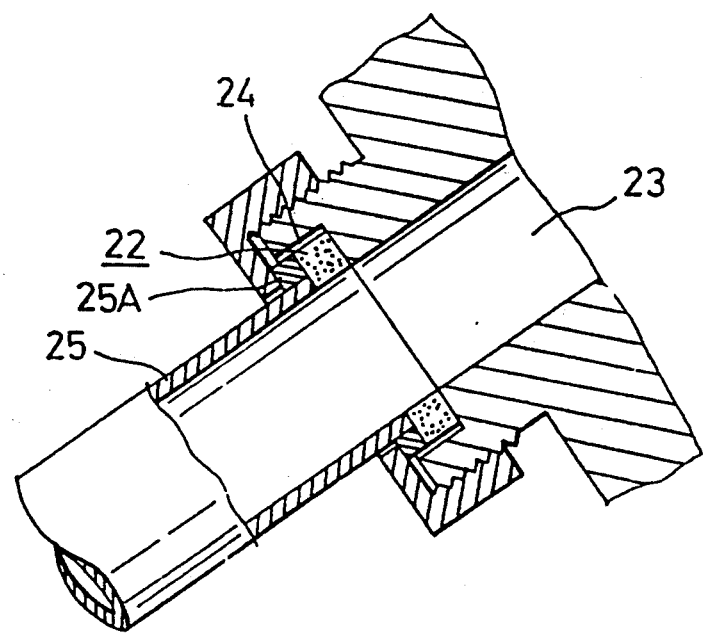
FIG. 9 is a vertical section view of an example of the use of the conventional spiral wound gasket shown in FIG. 8.

Alternatively, both the metal hoop material 2 forming the gasket body 4 and the annular body 5 may have V-shaped sections, as shown in FIG. 7B.

What is claimed is:

1. A spiral wound gasket for an exhaust pipe connection, which is formed into a spiral, said spiral wound gasket comprising: a gasket body comprising a metal hoop material overlapped with filler material; and an annular metal body comprising a metal hoop material, said annular metal body serving as a centering member integrally disposed at an inner periphery side of the gasket body, said annular metal body having a convex section which extends radially inwardly from the inner periphery side of the gasket body, said annular metal body defining an annular closed space with the inner periphery side of the gasket body.

2. The spiral wound gasket according to claim 1, wherein the metal hoop material has a corrugated section, wherein the gasket body defines generally flat outer surfaces, and wherein the convex section of said annular metal body is V-shaped with cut open ends which are diametrically outwardly directed and both abutting each other in the gasket body at the inner periphery side of the gasket body such that said annular metal body comes in contact with the inner periphery side of the gasket body and such that the distance from each of said generally flat outer surfaces to said annular metal body is equal, said annular metal body being made in a unitary structure with said gasket body.

3. The spiral wound gasket according to claim 1, wherein the gasket body defines generally flat outer surfaces, wherein the convex section of said annular metal body is U-shaped, wherein the metal hoop material has a corrugated section, wherein said annular metal body comes in contact with the inner periphery side of the gasket body such that the distance from each of said generally flat surfaces to said annular metal body is equal and wherein the metal hoop material of the annular metal body and the gasket body are integrally molded in a continuous manner.

* * * * *